Sept. 29, 1970  J. H. BOYD ET AL  3,531,235

TIMBER HARVESTER

Filed July 22, 1968  5 Sheets-Sheet 1

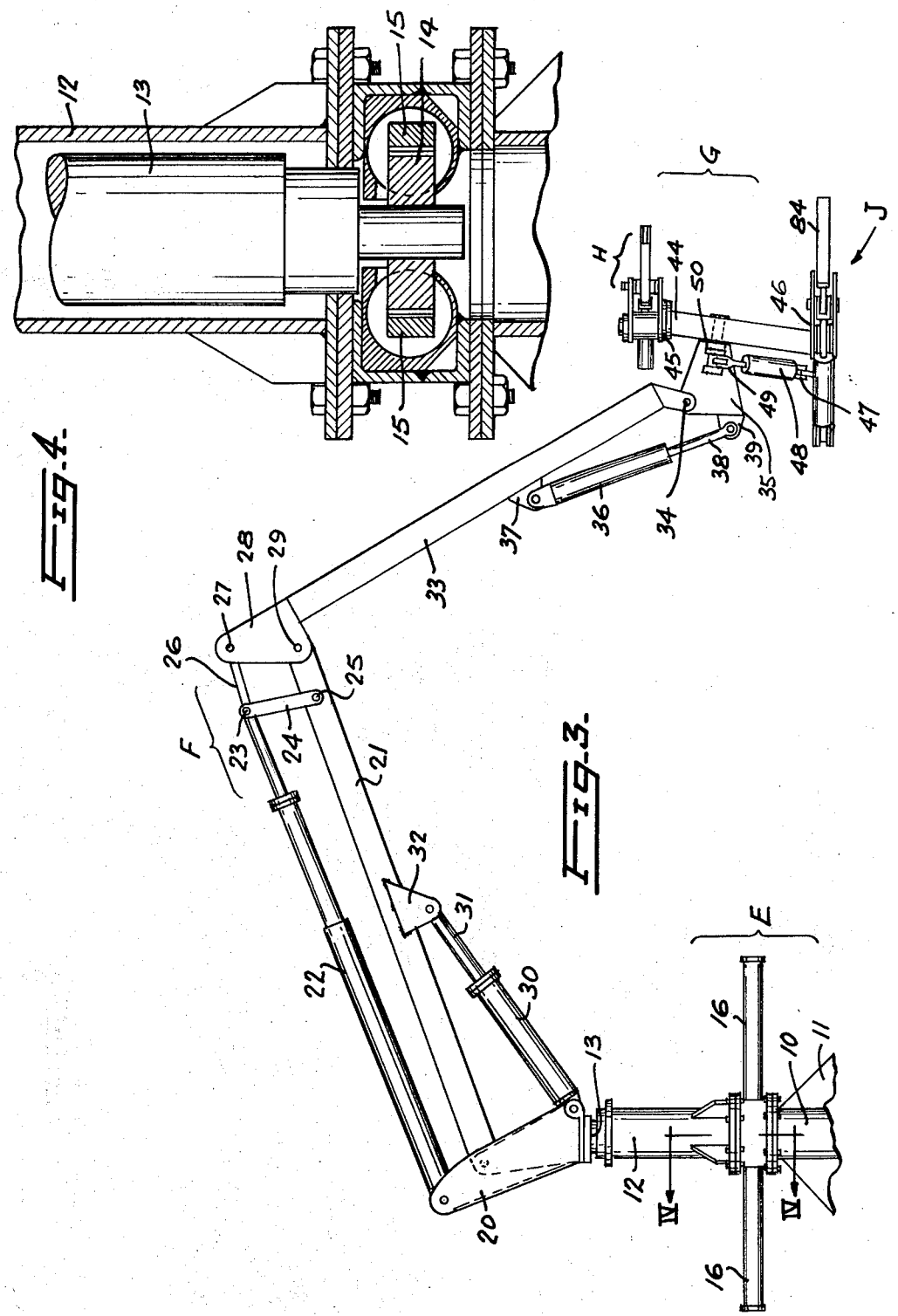

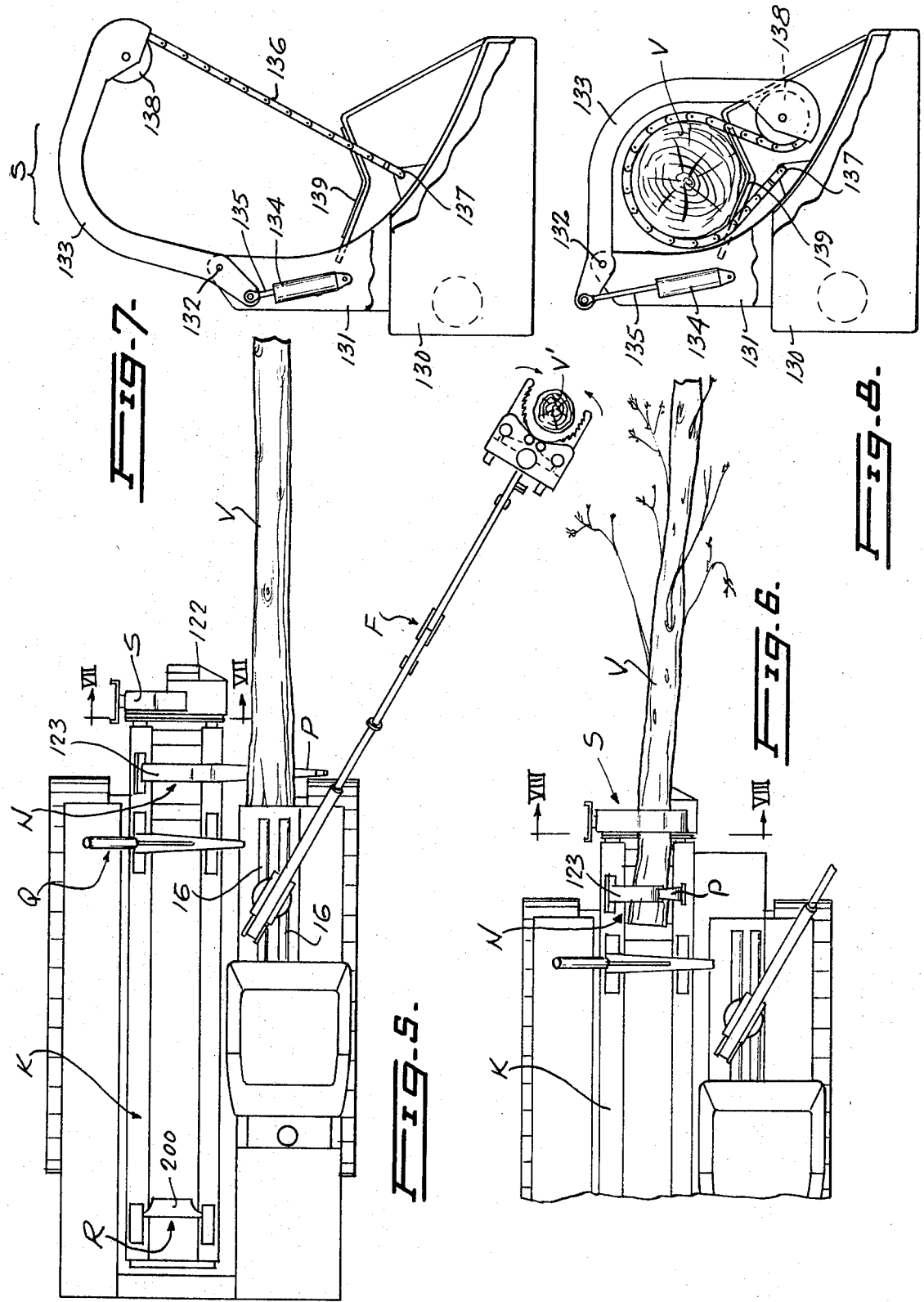

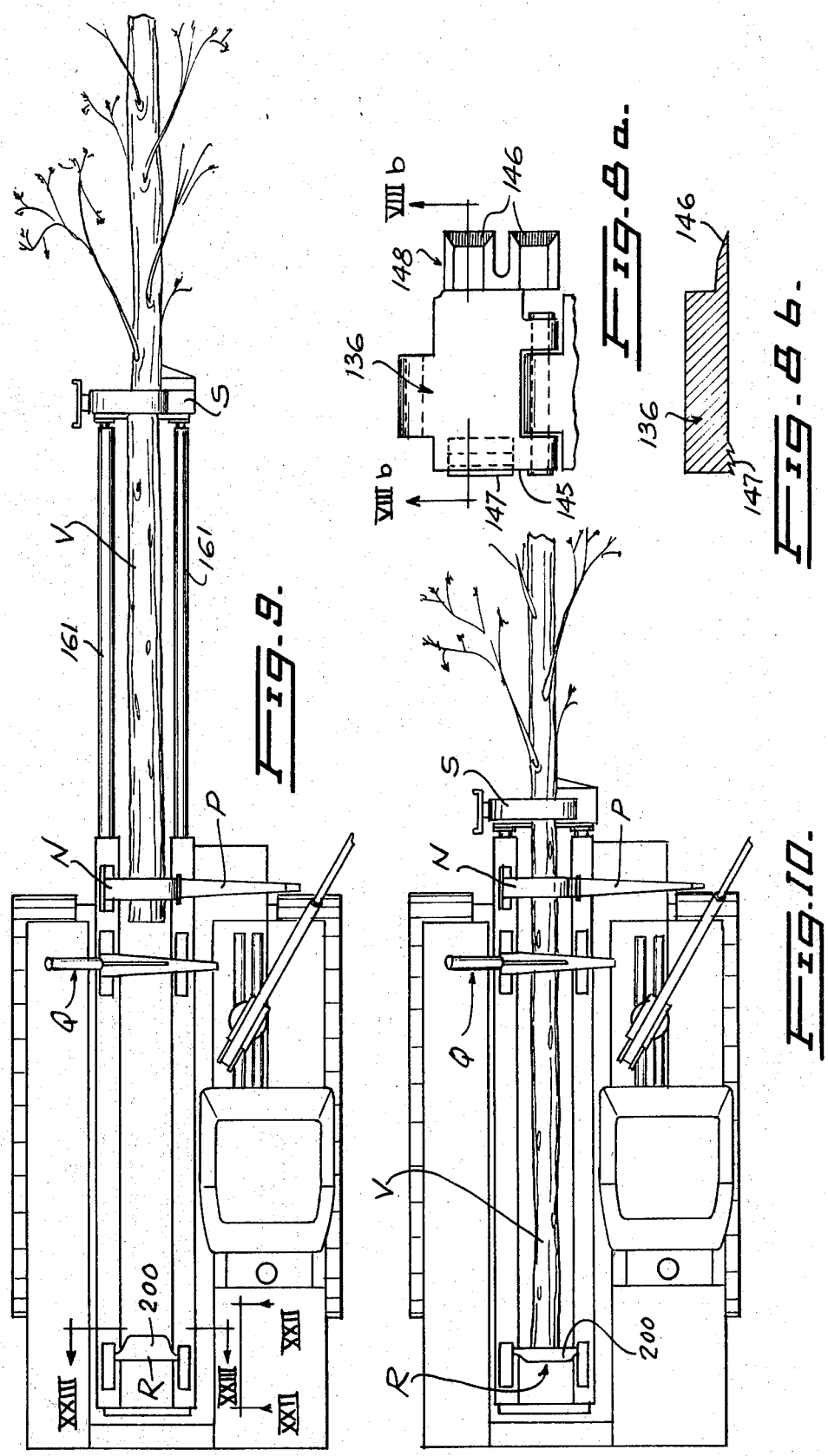

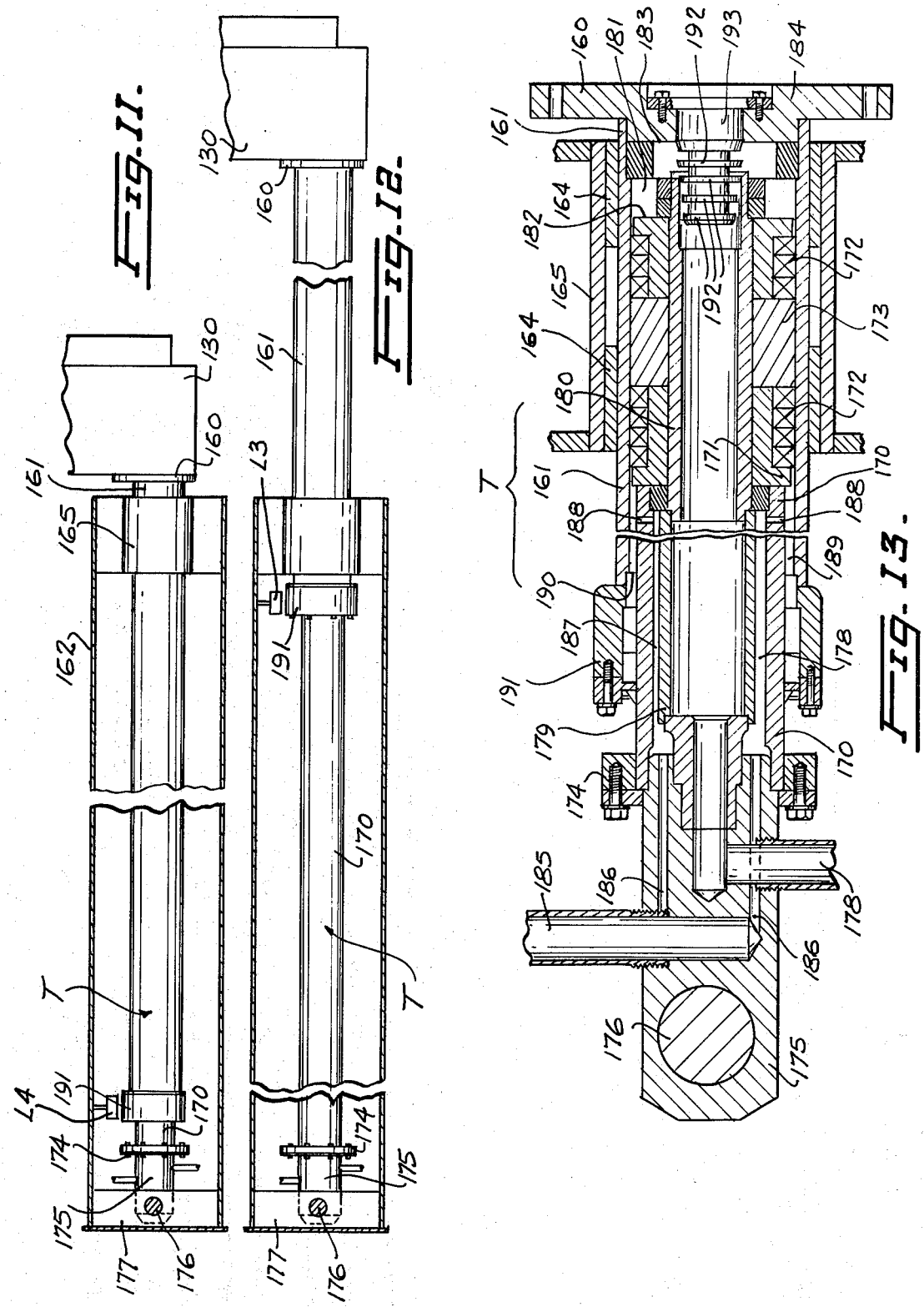

United States Patent Office 3,531,235
Patented Sept. 29, 1970

3,531,235
TIMBER HARVESTER
John H. Boyd and Anthony M. Paladino, Woodstock,
Ontario, Canada, assignors to Timberjack Machines
Limited, Woodstock, Ontario, Canada
Filed July 22, 1968, Ser. No. 746,431
Claims priority, application Canada, Feb. 14, 1968,
12,441
Int. Cl. A01g 23/08
U.S. Cl. 144—2                              9 Claims

ABSTRACT OF THE DISCLOSURE

A fluid operated cylinder assembly for driving a delimbing head in a timber harvesting machine. On the outward (delimbing) stroke the cylinder is operated pneumatically; on the return stroke, which serves to propel the tree, the cylinder is operated hydraulically, the pneumatic pressure being retained but overcome by the hydraulic pressure. Control of the outward stroke is thus achieved by release of the overriding hydraulic pressure.

RELATED APPLICATIONS

United States applications of J. Boyd et al. Ser. Nos. 746,416 and 746,430 filed concurrently herewith and corresponding to Canadian applications of J. H. Boyd et al. Ser. Nos. 12,442 and 12,443 filed Feb. 14, 1968.

This invention relates to improvements in timber harvesters and more specifically to improved tree delimbing means for incorporation into such harvesters.

It is known, for example, to delimb the trunks of felled trees by wrapping a delimbing chain around the trunk and then causing relative motion to take place between the chain and the trunk in the longitudinal direction thereof. In this connection reference is made to T. N. Busch et al. U.S. Pat. No. 3,059,677 issued Oct. 23, 1962 (and the corresponding Canadian Pat. No. 642,108 issued June 5, 1962).

The present invention is concerned with an improved mechanism for effecting reciprocal sliding motion of a delimbing unit along a tree trunk, and has been developed for incorporation into a timber harvesting machine such as is described in detail in copending Canadian patent application by J. Boyd et al. Ser. No. 12,442 filed concurrently herewith. However, it will be readily apparent that the combinations of features that constitute the present invention will be capable of use in other timber harvesting machines in which a delimbing unit (whether having a chain or other cutting tool as the essential delimbing element) is required to be reciprocated along a tree trunk, whether already felled or still standing.

Nevertheless, the present invention is especially suited to the requirements of machines of the type that delimb felled trees and in which the delimbing unit is called upon to perform the dual function of delimbing and timber propelling. For example, with a felled tree lying horizontally on a processing platform while firmly held at one end, a delimbing unit can be driven part way along the trunk to remove some of the branches. Then the clamp that previously held the tree can be loosened while the delimbing unit is tightened and driven back along the path that it took during the outward stroke. This return stroke will thus serve to propel the tree along the processing platform, after which it can be reclamped in its new position and the delimbing unit again driven on an outward stroke to cut the branches from another length of the tree. In this way the tree can be delimbed section by section and the length of the stroke of the delimbing unit need be only quite short relative to the full length of the tree.

In connection with the foregoing explanation of a use of a dual purpose delimbing unit, it is to be understood that this description is given merely by way of example, and that the outward stroke may be the propelling stroke, if desired, with the delimbing action taking place during the return stroke. Moreover, the principle is equally applicable to a device that moves itself along a tree (whether felled or still standing) rather than moves a tree along the device, since essentially the same relative motion is involved.

The inventive concept underlying the present invention resides in appreciation of the fact that the two strokes of the delimbing unit should preferably have different characteristics. The delimbing stroke should be performed at high speed, so as to sheer off the branches by impact and kinetic energy, but yet with the ability to yield to any unusually large resistance encountered, i.e., an especially large or otherwise stubborn branch that may have to be removed by hand. By contrast, the propelling stroke should preferably be carried out more slowly, but nevertheless certainly. Less speed is required, because no delimbing takes place during this stroke, and indeed less speed is desirable, because provision must be made for the possibility that the tree trunk is not perfectly straight. An attempt to force a slightly crooked tree trunk rapidly through the apparatus would invite damage to the tree and possible breakage of the tree.

To achieve the two strokes with such individual characteristics, there are employed, in accordance with the present invention, separate hyrdaulic and pneumatic pressure supplies. The operating mechanism has a cylinder element with a double-acting piston element inside it, one of these elements being connected to the delimbing unit, while the other is connected to the framework relative to which the delimbing unit is required to reciprocate. Passageways convey the fluid pressure supplies to the respective sides of the piston so as to move it by pneumatic pressure in one direction relative to the cylinder (in the preferred embodiment it is actually the cylinder that slides along the outside of the piston) and to move it by hydraulic pressure in the other direction.

The pneumatically driven stroke is best suited to become the delimbing stroke, because it embodies the ability of compressed air to expand suddenly and thus achieve the type of rapid but resilient stroke that is ideal for delimbing purposes. On the other hand, the hydraulically driven stroke is best suited for the propelling stroke.

In accordance with a further feature of the preferred form of the invention, the rate of action of the pneumatic stroke is still further enhanced by retaining pneumatic pressure in one end of the cylinder during performance of the hydraulically driven stroke. The hydraulic pressure in the second end of the cylinder is made large enough to overcome the pneumatic pressure and drive the piston. Then, when the return stroke is required, the hydraulic pressure is suddenly released for the pneumatic pressure immediately to take over. In this way only small amounts of pressure air need be fed into the pneumatic end of the cylinder; just enough to keep it topped up to the required extent. Reciprocation of the piston is achieved by control of the hydraulic fluid which is forced into and released from the other cylinder end. This arrangement has been found especially convenient in practice in a harvesting machine in which virtually all the other control functions are commanded by the application and/or removal of hydraulic pressure.

These and other features of the invention will be more clearly understood from the specific example described below in connection with the accompanying drawings which illustrate, by way of example only, one form of timber harvesting machine embodying the invention.

In the drawings:

FIG. 3 is a side view, on a larger scale, of the crane and boom of FIG. 1;

FIG. 4 is a section on the line IV—IV in FIG. 3;

FIG. 5 is a further plan view of the entire machine illustrating a first stage in the processing of a felled tree with the tree clamp in position to clamp onto a second standing tree;

FIG. 6 is a fragment of FIG. 5 showing a second stage in such processing;

FIG. 7 is a view of a delimbing unit in a first position, being a section taken on the line VII—VII in FIG. 5;

FIG. 8 is a view of the unit of FIG. 7 in a second position, being a section taken on the line VIII—VIII in FIG. 6;

FIG. 8a is a fragmentary view of the delimbing chain shown in FIGS. 7 and 8;

FIG. 8b is a section on VIIIb—VIIIb in FIG. 8a;

FIG. 9 is a further plan view of the machine showing a third stage in processing of a felled tree;

FIG. 10 is a view similar to FIG. 9 showing a fourth stage in the process;

FIG. 11 is a general side view of a cylinder assembly for operating the delimbing unit;

FIG. 12 is a side view of the cylinder assembly of FIG. 11, showing the same in extended position; and FIG. 13 is an enlarged longitudinal section of the cylinder assembly of FIGS. 11 and 12.

OVERALL CONSTRUCTION OF MACHINE

Figure 1:
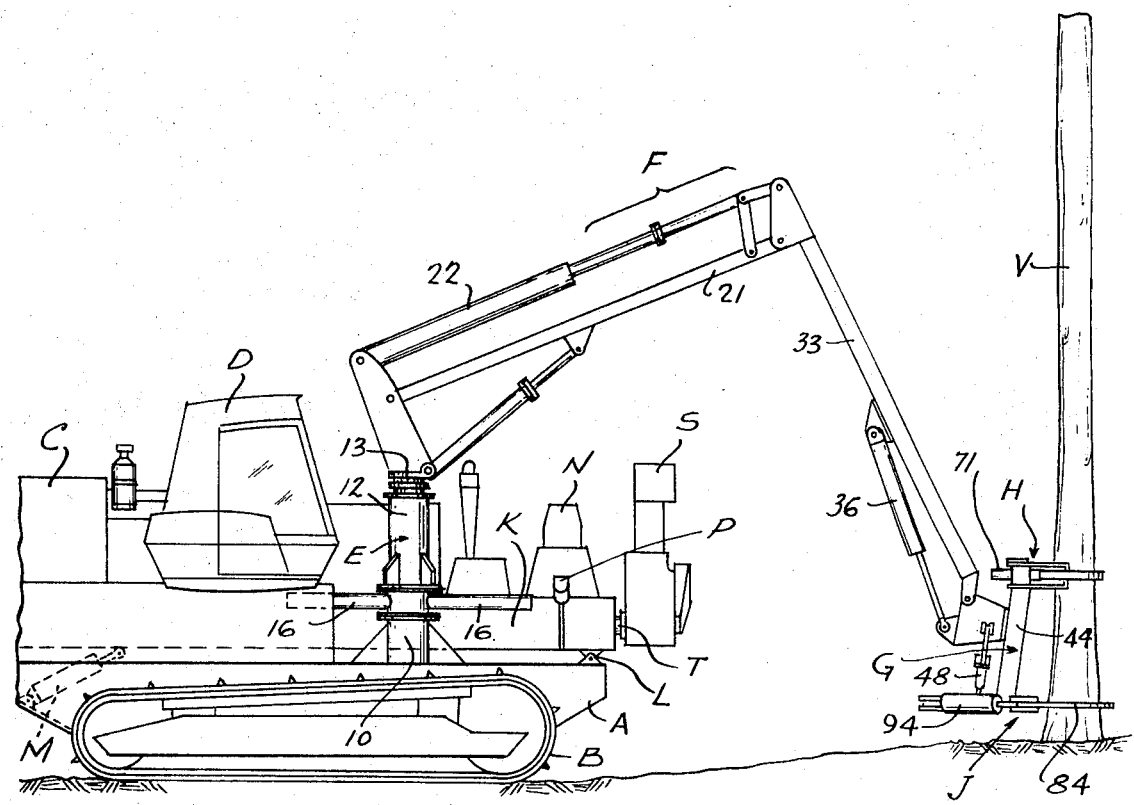
FIG. 1 is a general side view of the entire machine.
Figure 2:
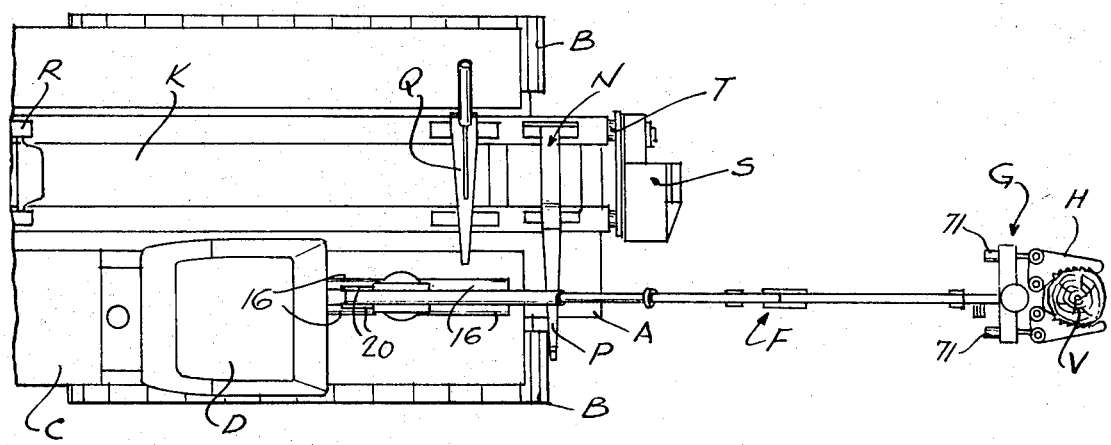
FIG. 2 is a plan view of the machine of FIG. 1.

The main portions of the timber harvesting machine shown in FIGS. 1 and 2 include a chassis A mounted on endless tracks B. A power assembly C mounted on the chassis A includes a diesel engine, hydraulic and pneumatic pumps and the necessary reservoirs for oil and air under pressure. The tracks B are driven by hydraulic motors (not shown), the entire machine being under control of a single operator who occupies a cab D.

A crane E is mounted forwardly of the cab D on one side of the chassis A and serves to support a boom F, on the remote end of which there is located a tree shear and clamp assembly G having, as its main components, a tree clamp H and a shearing device J having cutting blades 84.

A processing platform K is pivotally mounted at its front end on the chassis A by pivot pins L. The rear end of the platform K can be raised by means of hydraulic cylinders M to enable the rear of the platform K to be raised slightly and thus effectively to tilt its forward end downwardly to align the centre line thereof and the mechanisms mounted thereon with a felled tree, one end of which rests on the platform and the other end of which rests on the ground.

Mounted at the front end of the processing platform K is a clamp N and a kicker arm P for cooperating therewith. Mounted behind the clamp N on the processing platform K is a bucking shear Q; and at the rear end of the platform K there is located a butt plate assembly R. A delimbing unit S is situated forwardly of the front end of the processing platform K, being mounted on the ends of cylinder assemblies T.

CONSTRUCTION OF CRANE AND BOOM

Reference is now made to FIGS. 3 and 4 which show details of the crane E and boom F supported thereon. The crane E is mounted on the chassis A by means of a base post 10 reinforced by gusset plates 11. At the top of the base post 10 there is secured a further upwardly extending post 12 containing a shaft 13 on which the boom F is mounted. The shaft 13 is rotatable within the fixed structure of the crane E by means of a toothed wheel 14 secured to the end of the shaft, such toothed wheel 14 meshing with a pair of racks 15 that are slidable under the control of hydraulic cylinders 16. By means of these cylinders, the boom F can be rotated through any desired angle, which may be typically about 300° from one extreme position to the other. If a full 360° turn is required the crane must be extended to provide clearance, or can be mounted on the top of the cab D.

The boom F comprises a multiple plate structure 20 secured to the shaft 13, which plate structure 20 serves pivotally to support one end of a non-extensible beam 21 and also one end of a hydraulically operated telescoping member 22 extending generally parallel with the beam 21. At the remote end of the member 22 a pin 23 serves to connect it pivotally to one end of a link 24, the other end of which is pivotally secured by a pin 25 to the beam 21. The pin 23 also connects the member 22 to a second link 26 which is pivotally secured at its other end by a pin 27 to the top of a bracket 28. A lower part of the bracket 28 is pivotally connected by a pin 29 to the extreme end of the beam 21. Also supported by the plate structure 20 is a hydraulic cylinder 30, the piston 31 of which is connected by a bracket 32 to the beam 21.

Extending forwardly and downwardly from the bracket 28 is a further beam 33, on the lower end of which there is pivotally mounted by a pin 34 a positioning assembly 35 of the tree shear and clamp assembly G. A further hydraulic cylinder 36 connected at one end by a bracket 37 to the beam 33 has its piston 38 connected by a bracket 39 to the positioning assembly 35 to control the attitude thereof about the axis defined by the pin 34. The positioning assembly 35 pivotally supports a post 44, the upper end of which is connected to the body 45 of the tree clamp H and the lower end of which is connected to the body 46 of the shearingg device J. The body 46 of the shearing device J includes on its upper surface a lug 47 to which there is connected one end of a hydraulic cylinder 48, the piston 49 of which is connected to a lug 50 that projects from one side of the positioning assembly 35. Inward and outward movement of the piston 49 will have the effect of causing the entire assembly G including the post 44 to rotate about the axis defined by the spindle 43, which axis is approximately horizontal.

OPERATION OF TREE SHEAR AND CLAMP ASSEMBLY

The operation of the tree shear and clamp assembly G mounted on the end of the boom F will be readily apaprent from FIGS. 1 to 3. The operator will bring the vehicle to a suitable location adjacent a stand of trees. He will then control the crane E and its boom F by means of the various hydraulic cylinders already described. He will also ensure that the post 44 is in the correct attitude for the assembly G to embrace a selected standing tree V, such attitude being controlled by hydraulic cylinders 36 and 48. In this manner the assembly G is moved into an embracing position around the tree V with both its tree clamp H and its shearing device J in open condition. The jaws of the tree clamp H are then closed by means of the cylinders 71 to grasp the tree firmly, in the manner shown in FIG. 2. Next the cylinders 94 are operated to force closed the blades 84 of the shearing device J and cut through the tree. The blades 84 are now retained in their closed position so that they act as a support underlying the butt of the severed tree. Details of the construction and operation of the shearing device J are set out in copending Canadian patent application of J. Boyd et al. Ser. No. 12,443 filed concurrently herewith. (Abovementioned U.S. application Ser. No. 746,430.)

With the tree thus separated from its stump and still firmly held by the assembly G, the boom F and the positioning assembly 35 are manipulated to raise the tree slightly, move it towards the vehicle and then rotate it forwardly and downwardly to a substantially horizontal orientation with its butt overlying the kicker arm P on the processing platform K of the machine. With the tree in this position, the clamp H and shearing device J are reopened to allow the tree to drop a short distance down onto the kicker arm P and thus take up the position shown in FIG. 5, the boom F then being immediately returned by the operator to carry out a similar felling operation on a second tree V' while the first tree V is further processed on the platform K.

CONSTRUCTION AND OPERATION OF CLAMP AND KICKER ARM ASSEMBLY

The kicker arm P is provided with an hydraulic cylinder (not shown), the first step in the operation of this assembly being expansion of the piston of this cylinder to raise the kicker arm P to throw the felled tree V onto a curved craddle surface 122 of the processing platform K.

The clamp N consists of a pivoted clamp arm 123 formed on its underside with teeth and connected to a piston of an hydraulic cylinder (not shown). The arm 123 of the clamp N will initially be in raised or open position ready to receive the tree V, but is subsequently lowered to grip the butt end of the tree V tightly and hold it firmly (FIG. 6).

The kicker arm P can then be returned to its lower position to await a further tree (FIG. 9).

CONSTRUCTION AND OPERATION OF DELIMBING UNIT

The delimbing unit S is shown in FIGS. 5 and 7 in its open position, and in FIGS. 6 and 8 in its closed position. It will be open while the events just described take place, so that, when the tree V is thrown across by the kicker arm P into the open jaw of the clamp N, it will also enter the delimbing unit S.

The delimbing unit S consists of a carriage 130 supporting an upstanding post 131 on which there is pivotally mounted by a pin 132 a curved arm 133, the position of which is controlled by an hydraulic cylinder 134 having a piston 135 connected to the arm 133. A flexible delimbing chain 136 extends between a fixed connection at 137 on the carriage 130 and a rotatably mounted, spring tensioned drum 138 mounted in the end of the arm 133. When the arm 133 is moved to its closed position (FIG. 19), the delimbing chain 136 is wrapped around the tree V, the spring associated with the drum 138 being stretched to tension the chain 136 and ensure that it embraces the tree firmly. The tree rests on a V-shaped support 139 that is formed with a sharp edge to aid in the delimbing function of the chain 136.

FIGS. 8a and 8b show views of a fragment of the chain 136, illustrating the rear edge 135 and the forward edge 148 characterised by delimbing teeth 146. The rear edge 145 of the chain contains spiked portions 147 that engage the tree to advance it through the machine during return movement of the delimbing unit.

CONSTRUCTION AND OPERATION OF CYLINDER ASSEMBLIES FOR DELIMBING UNIT

The carriage 130 of the delimbing unit S is supported by connecting flanges 160 on the end of a pair of cylinder assemblies T housed in respective ones of a pair of channel frame members 162 of the processing platform K. These cylinder assemblies T are identical to each other and consequently only one has been shown in FIGS. 11 to 13, which views provide detailed illustration of this aspect of the machine.

Each assembly T includes a cylinder 161 that is slidingly supported in external bushings 164 mounted in a bushing housing 165 that is secured within a frame member 162. The cylinder 161 slides over a fixed piston 170 having a head 171 provided with packing 172 and a phenolic bushing 173. The piston 170 is secured at its end remote from the delimbing carriage 130 by means of a flange structure 174 to an anchor plate 175 that is secured by a bolt 176 to a fixed transverse member 177 extending across the end of the frame member 162.

An inlet conduit 178 for connection to a reservoir of high pressure air (not shown) communicates with the interior of sleeves 179 and 180 that extend along the inside of the piston 170 to a space 181 located between end surfaces 182 of the piston 170 and oppositely facing surfaces 183 of an end fitting 184 of which the flange 160 forms part. In this way, pressure air in the space 181 will have the effect of forcing the cylinder 161 to move outwardly, that is from the position shown in FIG. 11 to that shown in FIG. 12.

A further conduit 185 is provided for feeding pressure oil to the system, such oil being conducted along passageways 186 and 187 to pass through radially extending passageways 188 into a space 189 between the inner piston 170 and the outer cylinder 161. Here the oil bears against a surface 190 on a head portion 191 situated at the extreme inner end of the cylinder 161. Pressure oil in the space 189 will have the effect of tending to retract the sliding cylinder 161 from its FIG. 12 position to that of FIG. 11.

In the fully retracted position of the cylinder 161, the air space 181 is isolated from the interior of the sleeve 180 by an air cushion device comprising a plurality of metal discs 192 of gradually increasing diameter that are machined on a stem 193 projecting into the end of the sleeve 180 from the end fitting 184. It will be apparent that the discs 192 will tend to cause the formation of an air cushion in the space 181 during the final inward travel of the cylinder 161.

The power assembly C includes a reservoir for high pressure air and, when it is desired to move the delimbing unit S out along a tree V in the manner demonstrated in FIG. 9, the air pressure that is constantly maintained in the sleeves 179, 180 in the fixed piston 170 is permitted to force the cylinder 161 outwardly. It is possible in this way to achieve a very rapid travel of the delimbing unit S along the tree V to perform a delimbing operation, since the inertia of the unit S is comparatively small and the compressed air in the assembly is immediately available to provide the driving force. It is not necessary to wait for additional air to be pumped into the system.

To retract each cylinder 161, oil is admitted under pressure to the space 189 to overcome the force of the air pressure and thus to move the delimbing head S back towards the machine. This return movement takes place more slowly than the outward movement. As will appear from the description below, the unit S is required to move the mass of the tree during this return stroke, so that larger forces are required for this reason as well as to overcome the air pressure. For these reasons it is convenient to control such return movement with oil at relatively high pressure. Due to the relative smallness of the space 189, a relatively small volume of oil at high pressure is required to overcome the force of the air pressure to retract the delimbing unit S. During this return movement, the air within the fixed piston 170 and the reservoir attached to it will build up again in readiness for the next outward stroke. When such further outward stroke is desired, the oil pressure in the space 189 is suddenly released, allowing the air to take charge again and move the delimbing unit S outwardly, the relatively small volume of oil required to be displaced from the space 189 at this time also contributing to the speed with which this outward stroke can be achieved.

OPERATION OF BUCKING SHEAR AND BUTT PLATE ASSEMBLY

With the butt end of the tree V firmly held by the clamp N, as shown in FIG. 9, the delimbing unit S is forced rapidly out along the tree to remove limbs therefrom.

The next operation is to relax the grip of the clamp N and initiate a return stroke of the delimbing unit S when the spiked portions on the rear edge of the chain 136 will bite into the tree to hold it firmly, so that during this return stroke the tree is drawn into the machine in the manner demonstrated by FIG. 10. The throw of the delimbing unit S is such that this movement of the tree V will cause its butt to strike against the butt plate assembly R situated at the rear end of the platform K, which assembly R consists of a plate that is mounted on pins pivotally supported on posts projecting upwardly from the frame members 162. A limit switch detects a predetermined swinging movement of the plate and is connected to actuate the bucking shear Q and simultaneously retighten the clamp N upon detection of such predetermined movement.

DISPOSAL OF BOLTS

The portion of the processing platform K between the bucking shear Q and the butt plate assembly R has no floor. The freshly cut bolt of timber thus falls through the processing platform K between the frame members 162 into a storage compartment which may have a trap door type of bottom flap operated by a hydraulic cylinder. In this way a few bolts can be accumulated and then dumped together at a selected location.

As alternatives to this latter arrangement, the storage compartment may be dispensed with altogether, so that the cut bolts fall immediately onto the ground for subsequent skidding out of the bush by another vehicle, or the storage compartment may include known devices for wiring a number of bolts together in a bundle before dumping them to facilitate their subsequent removal.

Even before the bolt has dropped down into the storage compartment, processing of the second bolt will have already begun, the second outward stroke of the delimbing unit S being initiated as soon as the clamp N has been retightened, and taking place simultaneously with the bucking and disposal operations.

We claim:
1. In a timber harvester,
   (a) a framework including means for clamping a tree thereto,
   (b) a delimbing unit having cutting tool means for removing branches from said tree,
   (c) means mounting said delimbing unit on said framework for reciprocal sliding motion relative thereto hence relative to and along said tree,
   (d) at least one operating mechanism having a cylinder element and a double-acting piston element therein, said elements being connected each to a respective one of said framework and said delimbing unit to control said relative motion,
   (e) and separate pressure hydraulic and pneumatic input means to said operating mechanism,
   (f) said operating mechanism having passageways interconnecting each of said input means to a respective side of said piston element within said cylinder element to move said piston element in one relative direction by pneumatic pressure and in the other relative direction by hydraulic pressure.

2. A timber harvester according to claim 1, wherein said cutting tool means are located on said delimbing unit for removing branches from the tree during movement of said piston element in said one direction.

3. A timber harvester according to claim 2, wherein said delimbing unit includes tree grasping surfaces for feeding a tree relative to said framework during movement of said piston element in said other direction.

4. A timber harvester according to claim 1, wherein said operating mechanism is such that said piston element is moved in said other direction by hydraulic pressure sufficient to overcome said pneumatic pressure, and in said one direction by release of said hydraulic pressure to allow said pneumatic pressure to move said piston element.

5. A timber harvester according to claim 4, wherein said cutting tool means are located on said delimbing unit for removing branches from the tree during movement of said piston element in said one direction.

6. A timer harvester according to claim 5, wherein said delimbing unit includes tree grasping surfaces for feeding a tree relative to said framework during movement of said piston element in said other direction.

7. A timber harvester according to claim 4,
   (g) wherein said one direction in which the movement is pneumatically powered is the direction in which said framework and said delimbing unit move apart from each other, and said other direction in which the movement is hydraulically powered in the direction in which said framework and said delimbing unit move towards each other,
   (h) and wherein said delimbing unit includes tree grasping surfaces for feeding a tree relative to said framework at a first speed during movement in said other direction under said hydraulic power, said cutting tool means being effective to travel at a second speed greater than said first speed to delimb a tree held by said clamping means during movement in said one direction under said pneumatic power.

8. In a timber harvester, means for delimbing a stationary tree, said means including
   (a) a framework including means for clamping the tree thereto,
   (b) a delimbing unit having cutting tool means for removing branches from the tree upon axial travel in a first direction therealong;
   (c) pneumatically powered drive means interconnecting said framework and said delimbing unit for moving said unit rapidly along the tree in said first direction to delimb the same; and
   (d) hydraulically powered drive means for moving said unit relative to said framework in the reverse direction,
   (e) said delimbing unit including tree grasping surfaces for propelling the tree relative to the framework during said movement in the reverse direction.

9. A timber harvester according to claim 8, wherein said hydraulic drive means are powered to override the fluid pressure of said pneumatic drive means during said return movement with said pneumatic drive means remaining under pressure, and wherein said hydraulic drive means includes means for suddenly releasing said overriding hydraulic pressure to initiate said movement rapidly in the first direction under the now dominant pneumatic pressure.

References Cited
UNITED STATES PATENTS 3,398,774   8/1968   Hahn _____ 144—309

GERALD A. DOST, Primary Examiner

U.S. Cl. X.R.

144—3, 34